United States Patent [19]

Yamamoto et al.

[11] Patent Number: 4,696,379
[45] Date of Patent: Sep. 29, 1987

[54] HYDRAULIC BUFFER

[75] Inventors: Toshiaki Yamamoto, Toyota; Hiroyoshi Kako, Aichi; Takuo Shibata, Okazaki; Takashi Izuo, Toyota; Hajime Kamimae, Toyota; Hiroaki Takegawa, Toyota, all of Japan

[73] Assignee: Toyota Jidosha Kabushiki Kaisha, Aichi, Japan

[21] Appl. No.: 945,240

[22] Filed: Dec. 22, 1986

Related U.S. Application Data

[63] Continuation of Ser. No. 772,931, Sep. 5, 1985, abandoned.

[30] Foreign Application Priority Data

Oct. 8, 1984 [JP] Japan .................. 59-151164

[51] Int. Cl.$^4$ ........................... F16F 9/34; F16F 9/46
[52] U.S. Cl. .......................... 188/299; 188/319;
251/129.21; 251/325; 280/707; 280/714
[58] Field of Search ............... 188/299, 319; 280/707, 280/714; 251/129.08, 129.21, 325; 267/127

[56] References Cited

U.S. PATENT DOCUMENTS

| 1,504,773 | 8/1924 | Marstoy | 251/129.21 X |
|---|---|---|---|
| 2,836,264 | 5/1958 | Groen | 188/319 X |
| 3,365,033 | 1/1968 | Willich | 188/319 |
| 3,817,491 | 6/1974 | Burckhardt et al. | 251/129.21 |
| 4,437,645 | 3/1984 | Nomura et al. | 251/129.21 X |
| 4,496,134 | 1/1985 | Idogaki et al. | 251/129.08 X |
| 4,504,039 | 3/1985 | Akagi | 251/129.21 X |
| 4,535,815 | 8/1985 | Ohumi et al. | 251/129.21 X |
| 4,555,126 | 11/1985 | Ishimitsu et al. | 280/714 X |
| 4,575,009 | 3/1986 | Giraudi | 251/129.21 X |

FOREIGN PATENT DOCUMENTS

| 2911768 | 1/1983 | Fed. Rep. of Germany . |
| 3312899 | 6/1985 | Fed. Rep. of Germany . |
| 1417738 | 10/1965 | France . |

Primary Examiner—George E. A. Halvosa
Attorney, Agent, or Firm—Kenyon & Kenyon

[57] ABSTRACT

A hydraulic buffer includes a cylinder, a piston disposed movably in the cylinder to partition the interior of the cylinder into two liquid chambers, and a piston rod connected to the piston and having a first path communicating with one of the liquid chambers and extending axially beyond the piston and a second path communicating with the other of the liquid chambers. A solenoid valve received in the piston rod has a tubular spool disposed movably axially of the piston rod and has a third path capable of communicating with the second path in the piston rod. Further, inside the spool is disposed a pipe having a fourth path capable of communicating with the third path in the spool and communicating with the first path in the piston rod.

6 Claims, 1 Drawing Figure

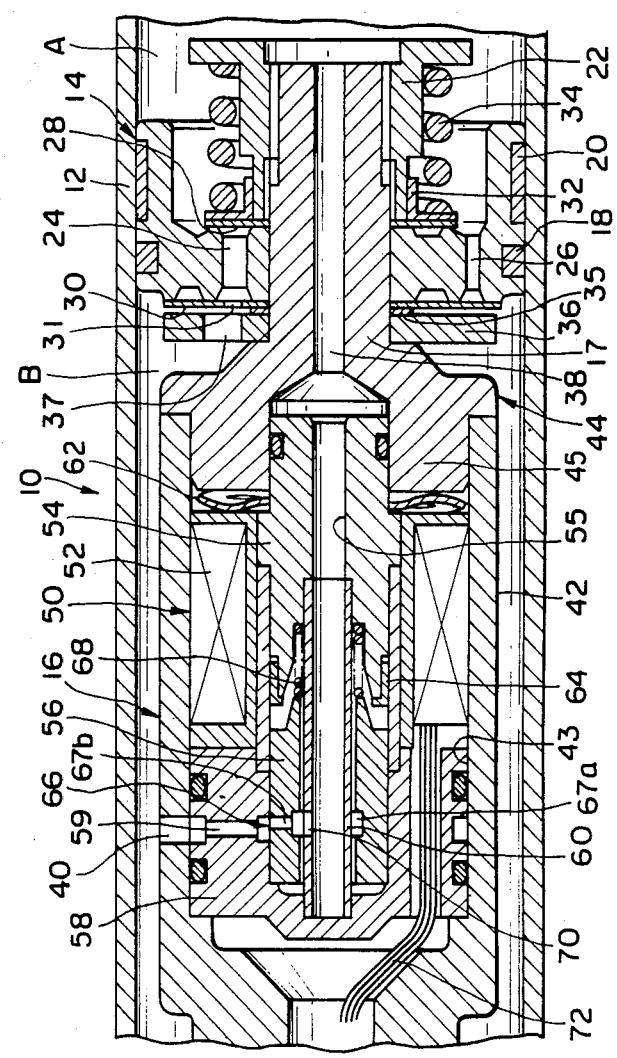

HYDRAULIC BUFFER

This application is a continuation of application Ser. No. 772,931, filed Sept. 5, 1985, now abandoned.

BACKGROUND OF THE INVENTION

1. Field of the Invention

This invention relates to a hydraulic buffer and, more particularly to a hydraulic buffer in which a damping force can be adjusted by a solenoid valve received in a piston rod.

2. Description of the Prior Art

In a hydraulic buffer in which a solenoid valve is provided with a tubular spool movable axially of a piston rod, to open and close a bypass path provided in the piston rod, with the solenoid valve built in the piston rod, so that liquid is allowed or not allowed to pass through the bypass path to change a damping force, the liquid passes through the interior of the spool and then radially so that in use the following troubles occur.

By the pressure gradient due to the flow of liquid in a spool and the viscous resistance of liquid, the spool is carried away by the flow having higher speed. Also, when the flow is only in one side of the spool and absent in the other side, for example, liquid enters the spool from one side thereof and leaves the spool from the central portion thereof, the balance of pressure between the front and rear of the spool is upset by pressure reduction due to the flow so that the spool is moved. As a result, the damping force cannot be adjusted, and the timing of adjustment gets out of order due to erroneous operations.

SUMMARY OF THE INVENTION

An object of the present invention is to provide a hydraulic buffer in which a bypass path in a piston rod is opened and closed by a solenoid valve having a spool hardly affected by the flow.

According to the present invention, a hydraulic buffer is provided which comprises a piston rod provided with a bypass path affording communication between two liquid chambers partitioned by a piston. In said piston rod is received a solenoid valve which comprises a tubular spool which can be moved axially of the piston rod to open and close said bypass path, and a pipe is disposed in the spool.

According to the present invention, since the pipe is disposed in the spool which is hardly affected by the pressure gradient due to the flow and the viscous resistance of liquid, even if the flow speed becomes higher, the spool is not carried away. Also, even if the flow is present only in one side of the spool, the balance of pressure between the front and rear of the spool is not upset so that the spool is not moved. As a result, the damping force can be accurately adjusted.

The other objects and features of the present invention will become apparent from the following description of a preferred embodiment of the invention with reference to the accompanying drawing.

BRIEF DESCRIPTION OF THE DRAWING

The drawing is a sectional view showing principal parts of a hydraulic buffer according to the present invention.

DESCRIPTION OF THE PREFERRED EMBODIMENT

A hydraulic buffer 10 comprises a cylinder 12, a piston 14 and a piston rod 16.

The piston 14 is disposed movably in the cylinder 12. The interior of the cylinder 12 is partitioned into two liquid chambers A,B in a liquid-tight manner by piston rings 18,20 fixed to an outer periphery of the piston. An end 17 of the piston rod 16 extends through the piston 14 and a nut 22 is screwed onto the end to couple the piston 14 with the piston rod 16. The piston 14 has a plurality of circumferentially spaced ports 24 (one port is shown in the drawing) through which liquid pases upon the extension of the piston rod 16 and a plurality of circumferentially spaced ports 26 (one port is shown) through which liquid passes upon the retraction of the piston rod 16, and both liquid chambers A, B communicate to each other through these ports.

At the liquid chamber A side of the ports 24 and the liquid chamber B side of the ports 26 are disposed respectively a valve body 28 formed of leaf spring and a valve body 30 formed of a leaf spring. The valve body 28 engages a coil spring 34 through a spring carrier 32, and is biased toward the piston 14 by the coil spring 34. On the other hand, the valve body 30 is sandwiched between the piston 14, a spacer 35 and a stopper 36 and contacts the piston 14. Positions of the valve body 30 and the stopper 36 opposed to the ports 24 in the piston are provided respectively with holes 31,37 to permit liquid to flow through the ports 24 upon the extension of the piston rod 16.

The piston rod 16 has a path 38 communicating to one liquid chamber A and extending axially beyond the piston 14 and a path 40 communicating to the other liquid chamber B. In the embodiment shown, the piston rod 16 consists of a first member 42 projecting and extending from an opening (not shown) of the cylinder 12 and a second member 44 having an end 45 fitted in a bored hole 43 of the first member and welded to the first member 42. The path 38 extends axially from an end face of the second member 44. On the other hand, the path 40 extends radially from the bored hole 43 of the first member 42 to an outer peripheral surface.

A solenoid valve 50 received in the piston rod 16 is provided with a coil 52, a fixed iron core 54, a spool 56 of movable iron core and a spool guide 58 in the embodiment shown. A pipe 60 is provided in association with the solenoid valve 50.

The spool guide having a path 59 opened radially and aligned with the path 40 in the piston rod 16 is fitted in the bored hole 43 of the second member 42. The coil 52 is further disposed in the bored hole 43. These are immovably held by an elastic spacer 62 interposed between the coil 52 and the end 45 of the second member 44.

The fixed iron core 54 formed cylindrically is fixed to the end 45 of the first member 44 and the coil 52. On the side of the fixed iron core 54 facing the spool 56 is mounted a cap 64 for isolating a magnetic circuit.

The spool 56 formed cylindrically and disposed axially movably has a pth 66 capable of communicating to the path 40 of the piston rod. In the embodiment shown, the spool 56 is supported axially movably by the spool guide 58 and biased to be kept away from the fixed iron core 54 by a coil spring 68 disposed between the spool and the fixed iron core 54. When the spool 56 abuts against the spool guide 58 as shown in the drawing, the path 66 communicates to the path 40 in the piston rod through the path 59 of the spool guide 58. The path 66 is formed of an annular groove 67a provided on an inner peripheral surface and one or a plurality of path portions 67b extending from the annular groove 67a to an outer peripheral surface. The paths 66 accurately communicates to a path 70 of the pipe 60 as will be later described.

The pipe 60 is disposed inside the spool 56 and communicates to the path 38 of the piston rod 16. In the embodiment shown, the pipe 60 is disposed between the fixed iron core 54 and the spool guide 58 and communicates to the path 38 of the piston rod 16 through a path 55 of the fixed iron core 54. The path 70 communicates to the path 66 of the spool 56 when the spool 56 abuts against the spool guide 58 as shown in the drawing. By said paths is forms a bypass path affording communication between the liquid chambers A,B.

The spool 56 may be axially movably supported by the pipe 60 instead of the spool guide 58. In either case, to facilitate the movement of liquid accompanying the movement of the spool 56, one of gaps between the spool 56 and the spool guide 58 and between the spool 56 and the pipe 60 is formed larger than the other.

Another measure to facilitate the movement of liquid accompanying the movement of the spool 56 is as follows; the spool 56 is formed with a path extending axially therethrough without intersecting the path 66 so that liquid leaking into a space or the like between the spool 56 and the fixed iron core 54 can flow through the path.

The spool guide 58 may be omitted depending upon the structure of the solenoid valve 50. Also, the present invention applies to a so-called twin tube type hydraulic buffer having another cylinder disposed outside the cylinder 12.

The hydraulic buffer 10 is installed on a suspension of an automobile for example, and the coil 52 is connected to an outside power source through a power cord 72.

When electricity is not supplied to the coil 52 during travel of the automobile, the spool 56 is held in the position shown in the drawing. When the piston rod 16 is extended and retracted, liquid in the liquid chambers A, B flows through a bypass path consisting of the path 38, path 55, pipe 60, path 70, path 66, path 59 and path 40 in addition to the port 24 or 26 provided in the piston 14; so that the damping force produced by the hydraulic buffer 10 is reduced to provide a better ride.

When electricity is supplied to the coil 52, the spool 56 is attracted by the fixed iron core 54 to block the communication between the path 66 in the spool 56 and the path 70 in the pipe 60 or the communication between the path 66 and the path 59 in the spool guide 58; so that liquid does not flow through the bypass path in the piston rod 16. As a result, the damping force produced by the hydraulic buffer 10 is increased to maintain satisfactory controllability.

Since the spool 56 is disposed outside the pipe 60, it is hardly affected by the pressure gradient or the like due to the flow and is kept in position even if the spool 56 is in the position shown or the position to which it is attracted by the fixed iron core 54.

What is claimed is:

1. A hydraulic buffer comprising:
   a cylinder containing liquid;
   a piston disposed movably in the cylinder to partition the interior of said cylinder into two liquid chambers;
   a piston rod connected to the piston and having a first path communicating with one of said liquid chambers and extending axially beyond said piston and a second path communicating with the other of said liquid chambers;
   a solenoid valve provided with a tubular spool disposed in said piston rod for movement axially with respect to the piston rod and having a third path extending radially and located for communicating with the second path in said piston rod in at least one axial position of said spool; and
   a pipe disposed inside and extending all the way through said spool, the pipe having a first end sealingly communicating with the first path in said piston rod, having a second closed end, and having a fourth path extending radially intermediate said first and second ends in substantial radial alignment with said second path and located for communicating with the third path in said spool at least when the spool is in said one axial position, such that the pipe substantially isolates the ends of the spool from liquid flowing between the fist and second paths, thereby eliminating the influence, on the axial position of the spool, of the pressure gradient due to flow of said liquid between said first and second paths.

2. A hydraluic buffer as claimed in claim 1, wherein said solenoid valve further comprises a fixed iron core having a fifth path communicating with the first path in the piston rod and a spool guide disposed in spaced relation to the fixed iron core, said spool being disposed movably between the fixed iron core and the spool guide, and said pipe being disposed to extend from the fixed iron core to the spool guide and communicate with the fifth path in the fixed iron core.

3. A hydraulic buffer as claimed in claim 2, wherein said fixed iron core has a magnetically insulating cap at an end of the core facing said spool for insulating a magnetic circuit from said spool.

4. A hydraulic buffer according to claim 2 wherein said first end of said pipe disposed inside said spool is inserted into said fixed iron core and said second end of said pipe is inserted into said spool guide, and wherein a sealing member is disposed between an outer surface of said fixed iron core and the first path in said piston rod, such that liquid flowing in the paths is impeded from communicating with the tubular spool via the ends of the tube.

5. A hydraulic buffer as claimed in claim 1 and further comprising a means for facilitating the movement of the liquid in the cylinder accompanying the movement of said spool.

6. A hydraulic buffer as claimed in claim 1, wherein the third path in said spool comprises an annular groove on an inner peripheral surface of the spool and at least one path portion extending from the annular groove to an outer peripheral surface of the spool.

* * * * *